United States Patent
Kraus

(10) Patent No.: US 8,596,194 B2
(45) Date of Patent: Dec. 3, 2013

(54) METHOD AND APPARATUS FOR DETERMINING FRACTION OF HAY AT DIFFERENT MOISTURE LEVELS

(75) Inventor: Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 455 days.

(21) Appl. No.: 12/913,881

(22) Filed: Oct. 28, 2010

(65) Prior Publication Data

US 2012/0103205 A1    May 3, 2012

(51) Int. Cl.
*B65B 13/02*    (2006.01)
*B65B 57/10*    (2006.01)

(52) U.S. Cl.
USPC ..................................... 100/2; 100/4; 100/35

(58) Field of Classification Search
USPC ..................... 100/2, 4, 35, 45, 73, 74; 53/431
See application file for complete search history.

(56) References Cited

U.S. PATENT DOCUMENTS

| | | | |
|---|---|---|---|
| 4,918,910 A * | 4/1990 | Sheehan et al. | 56/341 |
| 4,929,904 A | 5/1990 | Bohman et al. | |
| 7,415,924 B2 * | 8/2008 | Roberts | 100/102 |
| 7,743,699 B1 * | 6/2010 | Freeman et al. | 100/73 |

FOREIGN PATENT DOCUMENTS

| | | |
|---|---|---|
| DE | 3232746 | 3/1984 |
| EP | 1795065 | 6/2007 |

OTHER PUBLICATIONS

European Search Report, Feb. 14, 2012, 4 pages.

* cited by examiner

*Primary Examiner* — Jimmy T Nguyen

(57) ABSTRACT

A method and apparatus are provided for determining the fraction of hay at various moisture levels during an agricultural baling process. A moisture sensor array is provided on an agricultural baler to sense the moisture content of incoming crop material as the baling process progresses. The moisture sensor array is connected to an ECU that is programmed to determine the ratios of incoming crop material that are at or above particular moisture content levels. An indication is given to the operator by way of an operator output device regarding the moisture content ratio.

2 Claims, 5 Drawing Sheets

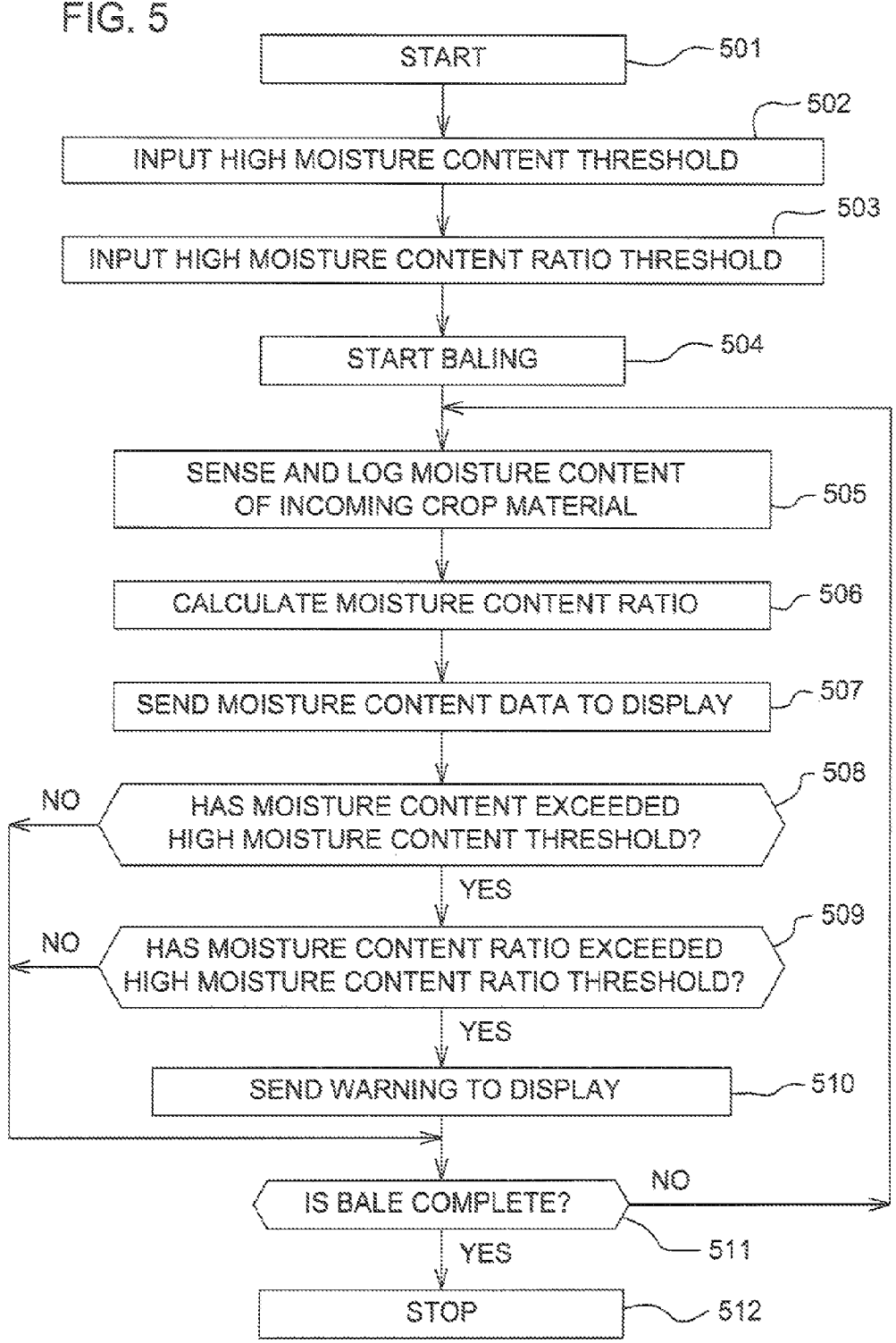

METHOD AND APPARATUS FOR DETERMINING FRACTION OF HAY AT DIFFERENT MOISTURE LEVELS

FIELD OF THE INVENTION

The present invention relates to agricultural balers. More particularly, the invention relates to agricultural balers having moisture sensors for determining the moisture content of crop material being baled therein. Specifically, the invention relates to a method and apparatus for determining the fractions of crop material at varying moisture levels.

BACKGROUND OF THE INVENTION

Round and square agricultural balers are known that are equipped with on-board moisture sensor systems. These sensor systems are typically employed to sense and display and/or record the "average" moisture content of the bale. One purpose of sensing the moisture content of the bale is to determine whether the crop material can be safely baled, inasmuch as overly moist crop material cannot be stored without application of preservative or in some cases not at all. Overly moist hay without preservative tends to rot, mold and otherwise decompose, thereby spoiling the hay. Further, the decomposition of the hay creates heat and in some cases has been responsible for fires. The problem with making the decision as to whether a bale can be safely stored based upon the average moisture content of the bale is that it is possible (and often occurs) that the "average" moisture content of the entire bale is in an acceptable range (typically less than 20%), while a large enough portion of the bale might be at a moisture level that is too high for proper storage, thereby resulting in significant mold, spoilage, and even fire due to spontaneous combustion as a result of decomposition. For example, if it were assumed that, in a given bale, 75% of the bale is at a 15% moisture content level, but 25% of the bale is at a 22% moisture content level, then the average moisture content of the entire bale is 16.75%. Based on this average value, it appears that the bale should store well without concern for excessive mold, spoilage or fire. However, because 25% of the bale is too wet for storage, there is a high chance that mold, spoilage or fire could occur.

Accordingly there is a need in the art for a means to accurately determine not just the average moisture content of a bale, but also the fraction of the bale which is at a high moisture level.

SUMMARY OF THE INVENTION

It is therefore an object of the invention to provide a means for-determining the moisture content of agricultural crop material during a baling process.

It is another object of the invention to provide a means for determining what portion of the crop material being baled is at a high moisture level.

A further object of the invention is to provide such means that is compatible with known baling equipment, practices, and techniques.

These and other objects of the invention are attained by a method for determining a moisture content ratio of crop material during a baling process with an agricultural baler, the baler having a moisture sensor array disposed for sensing the moisture content of crop material entering the baler, and an ECU in communication with the moisture sensor array, the method comprising the steps of: sensing a moisture content of crop material entering the baler; communicating the moisture content of the incoming crop material to the ECU; calculating in the ECU a moisture content ratio, the moisture content ratio representing a percentage of crop material entering the baler that is at or above a particular moisture content; and, communicating the moisture content ratio information to an operator.

Further objects of the invention are attained by a method for determining a moisture content ratio of crop material during a baling process with an agricultural baler, the baler having a moisture sensor array disposed for sensing the moisture content of crop material entering the baler, and an ECU in communication with the moisture sensor array, the method comprising the steps of: inputting a high moisture set point in the ECU, the high moisture set point corresponding to a moisture content of crop material entering the baler, below which it is deemed safe to store the bale; inputting a high moisture set point ratio in the ECU, the high moisture set point ratio corresponding to a percentage of incoming crop material that is above the high moisture set-point at which it is deemed necessary to alert the operator that the bale is not in condition for storage; commencing a baling process; sensing a moisture content of the incoming crop material; determining whether the sensed moisture content of incoming crop material one of meets and exceeds the high moisture set point; calculating a moisture content ratio, the moisture content ratio representing a percentage of crop material entering the baler that is at or above a particular moisture content; determining whether the calculated moisture content ratio of incoming crop material one of meets and exceeds the high moisture set point ratio; and, if the calculated moisture content ratio of incoming crop material one of meets and exceeds the high moisture set point ratio communicating a notification to the operator.

Other objects of the invention are attained by an improved agricultural baler having an ECU and a crop moisture sensor, the improvement comprising: the crop moisture sensor being a moisture sensor array arranged for sensing a varying moisture content of crop material entering the baler across substantially, an entire width of a crop inlet; the moisture sensor array communicating the varying moisture content to the ECU, the ECU being programmed to calculate a moisture content ratio from the varying moisture content; and, an indicator in communication with the ECU whereby an operator is provided with information concerning the moisture content ratio.

In general a method and apparatus are provided for determining the fraction of hay at various moisture levels during an agricultural baling process. A moisture array is provided on an agricultural baler to sense the moisture content of incoming crop material as the baling process progresses. The moisture sensor array is connected to an ECU that is programmed to determine the ratio of incoming crop material that is at a particular moisture content level. An indication is given to the operator by way of an operator output device regarding the moisture content ratio.

BRIEF DESCRIPTION OF THE DRAWINGS

For a complete understanding of the objects, techniques, and structure of the invention, reference should be made to the following detailed description and accompanying drawings, wherein.

DESCRIPTION OF THE PREFERRED EMBODIMENT

Figure 1:
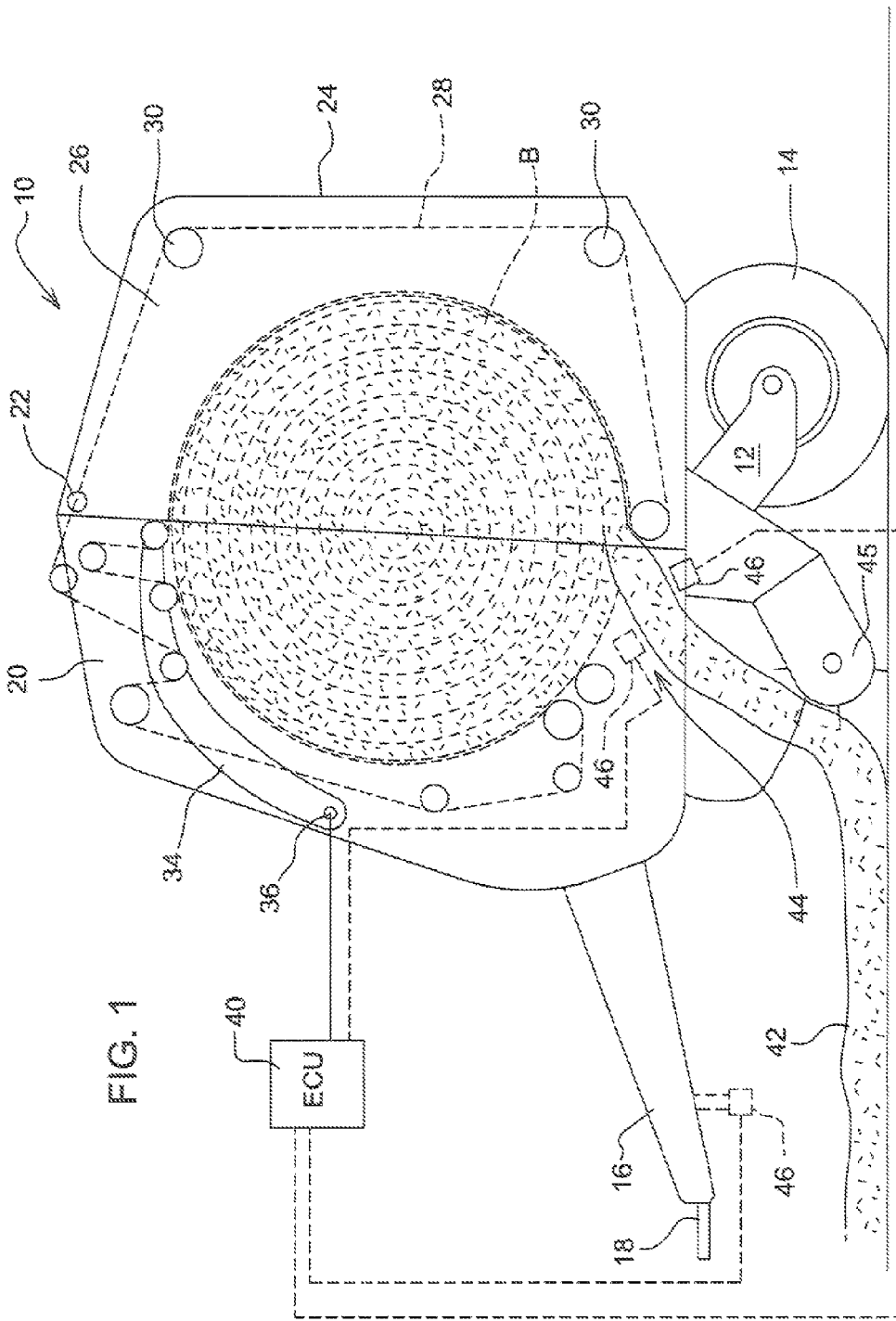
FIG. 1 is an elevational, partially schematic view of a round baler.

Referring now to FIG. 1 it can be seen that a round baler is generally designated by the number 10. The baler 10 is in many respects conventional in its arrangement and includes a main frame 12 supported on a pair of ground wheels 14 (only one of which is shown). A draft tongue 16 has a rear end joined to the frame 12 and has a forward end defined by a clevis arrangement 18 adapted for being coupled to a towing vehicle (not shown). A pair of upright side walls 20 are fixed to the main frame 12 and define forward regions of opposite side walls of a baling chamber. Mounted for pivoting vertically about a horizontal pivot arrangement 22 located at an upper rear location of the side walls 20 is a discharge gate 24 including opposite upright side walls 26, which define opposite sides of a rear region of the baling chamber. A gate cylinder arrangement (not shown) is coupled between the main frame 12 and the opposite side walls 26 of the discharge gate 24 and is selectively operable for moving the discharge gate 24 between a lowered baling position and an opened discharge position. The baler 10 is of a variable size chamber design and thus comprises a plurality of longitudinally extending side-by-side belts 28 supported on a plurality of rollers 30 (only a few of which are shown). A bale forming chamber is defined by the sidewalls 20, 26, the rollers 30 and the belts 28.

As mentioned previously, the baler 10 illustrated is a variable chamber design, wherein crop is rolled up in a spiral fashion in a nip formed between oppositely moving adjacent loops of belts 28. The space between adjacent loops of belts 28 grows as the forming bale B grows larger. Accordingly, a belt tensioning device 34 is provided to take up slack in the belts 28 as needed. Thus the position of the tensioning device 34, at any given time, is an indication of the size of the bale B at that time A bale diameter sensor 36 in the form of a potentiometer is affixed to the pivot point of the tensioning device 34 and thus provides an electrical signal correlating with bale diameter to an Electronic Control Unit (ECU) 40. The ECU 40, via appropriate logic, can then translate the signal into meaningful bale size data that can be communicated to an operator by way of an appropriate display device (not shown). In addition to providing an indication of bale size to the operator, the ECU 40 can be adapted to utilize bale diameter data for other purposes such as triggering a twine or wrapping cycle, opening the discharge gate, initiating bale discharge, to control the application of preservative to the bale and to communicate crop moisture content information to the operator as will be described in further detail below.

In its general operation the baler 10 is drawn through a field by a prime mover (not shown) attached to the tongue 16. Crop material 42 is fed into a crop inlet 44 of the bale forming chamber from a windrow of crop on the ground by a pickup 45. In the baler 10, the crop material 42 is rolled in spiral fashion, as described above, into the cylindrical bale B. Upon completion, the bale B is wrapped with twine or other appropriate wrapping material and is discharged by actuation of gate cylinders that open the gate 24 permitting the completed bale B to be discharged from the baler 10 onto the ground.

Figure 2:
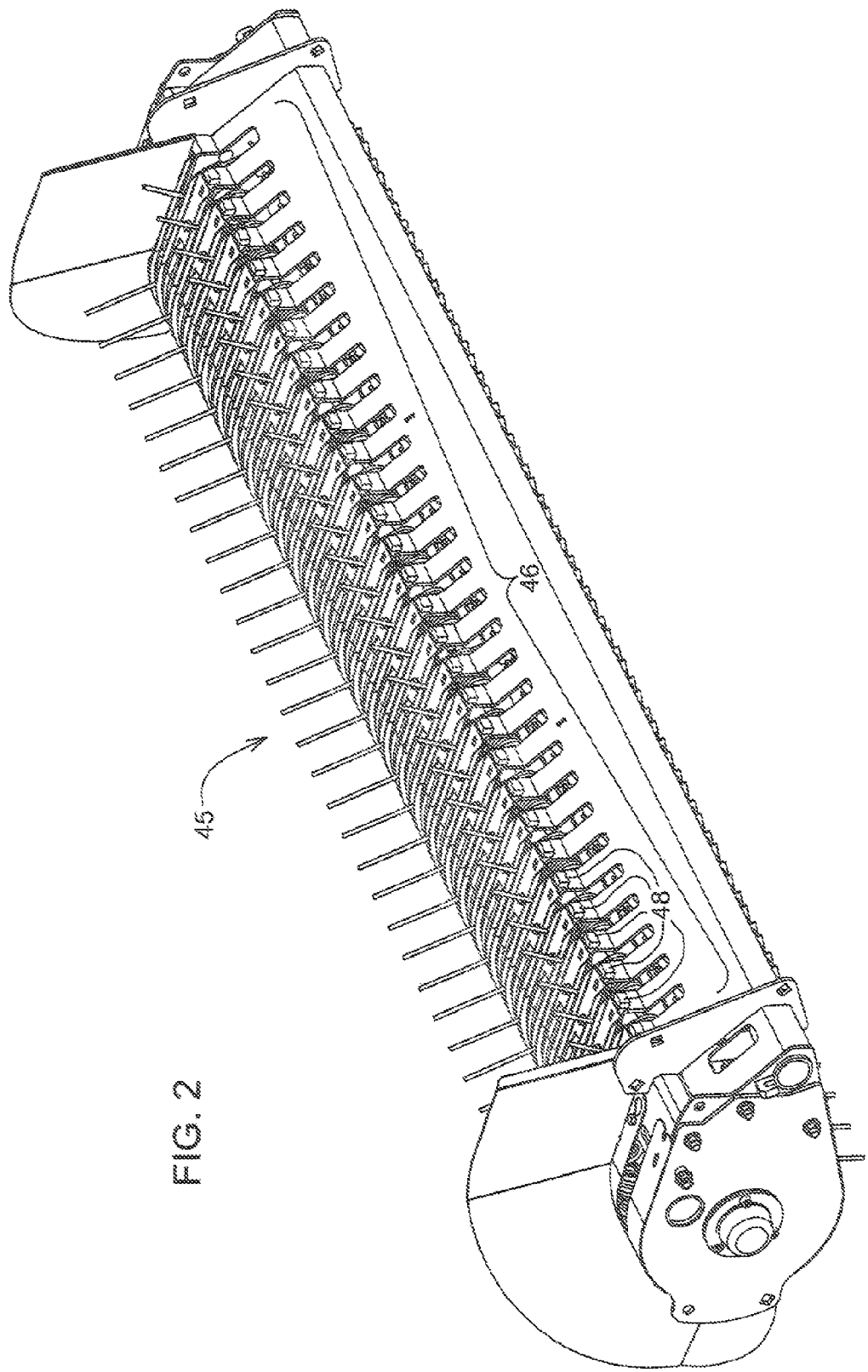
FIG. 2 is a perspective view of a portion of a crop pick-up device for the round baler of FIG. 1 having a moisture sensor array.

With continuing reference to FIGS. 1 and also with reference to FIG. 2, it can be seen that the baler 10 is further provided with an array 46 of moisture sensors that are preferably distributed across the width of the baler and preferably below the flow of incoming crop material as indicated by the sensor array 46A shown in FIG. 1. FIG. 2 shows, in more detail, how the sensor array can be arranged on the pickup 45. It is also possible to mount the moisture sensor array 46 at other locations on the baler such as above the flow of incoming crop material as it enters the crop inlet as indicated by the sensor array 46B shown in FIG. 1, or, for example, on the draft tongue 16 of the baler so that incoming crop moisture is sensed while the crop is still on the ground, as indicated by the sensor array 46C shown in FIG. 1. The possible locations for the moisture sensor array 46 are shown by way of example only. It is contemplated that the sensor array 46 can be located at other locations on the baler 10 that are not specifically shown or described—it only being necessary that the moisture sensors be positioned to monitor moisture content at the time or shortly before crop enters the crop inlet.

The moisture sensor array 46 is preferably comprised of a plurality of sensor elements 48 evenly distributed across the width of the baler 10, as shown by way of example in FIG. 2. It is contemplated that such sensor elements 48 could be of the conductive, fringe capacitance microwave, transmitted microwave, or Near Infrared (NIR) type, as well as other available sensor types capable of determining moisture content in the incoming crop material. It is also possible that with certain sensor types having the capability of measuring the moisture content of incoming crop material across the baler width, it may not be necessary to provide multiple sensors but instead a single sensor may be adequate. Regardless of the type of moisture sensors employed, the output of the sensor array 46 is communicated to the ECU 40 by way of a wired or wireless connection.

Figure 3:
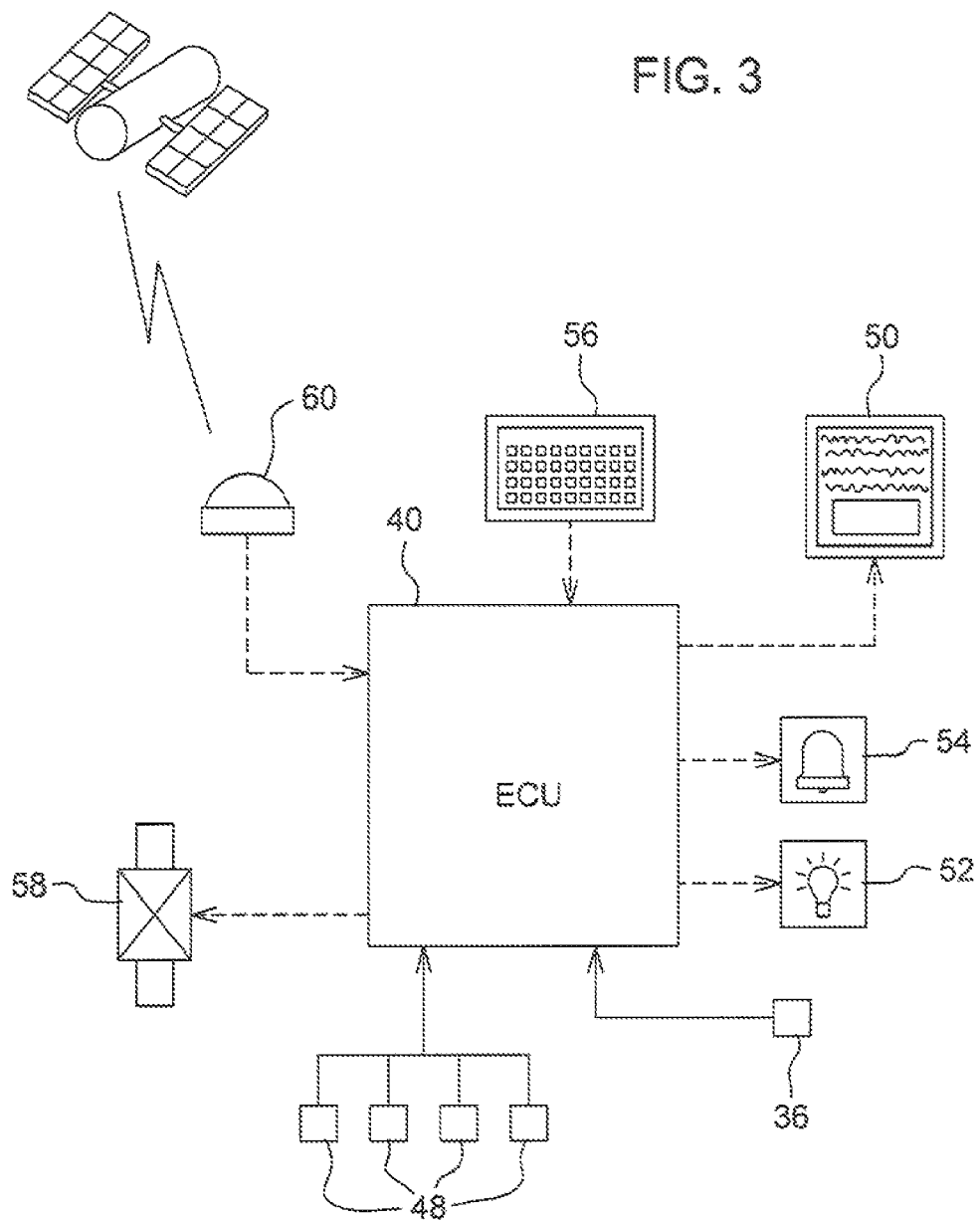
FIG. 3 is a schematic view of a crop moisture sensing arrangement for an agricultural baler.

The ECU 40 is programmed with logic to translate the output signal of the moisture sensor array 46 into moisture content information. This information is stored in a memory of the ECU 40 and the sensor data is thus continuously logged throughout the baling process. As shown in FIG. 3 the ECU 40 is in turn connected to a display device 50 so that the moisture sensor data being logged in the ECU 40 is, or can be, communicated to the operator. The manner in which the moisture content information is communicated depends upon the type of display device being employed, however, it is contemplated that with an appropriate graphical display device 50 the operator can monitor the moisture content of the crop material entering the baler in real time by way of a graph or by numeric moisture level values. It is also contemplated that the display can produce a visual warning via an indicator 52 and/or an audible alarm 54, when, for example, the percentage of incoming crop material above a pre-determined threshold moisture content exceeds a pre-determined threshold percentage value or ratio. These threshold values onsetpoints can be pre-programmed into the ECU 40 by the operator using an appropriate input device 56. Thus the operator will recognize that incoming crop material, and therefore the bale, will be above a pre-determined acceptable moisture content value for storage, thereby allowing the operator to make a decision as to whether to stop the baling operation, apply a preservative, or otherwise identify that the particular bale has an unacceptably high moisture content. The ECU can also utilize the moisture content data to automatically initiate, application of a preservative by actuating a preservative applicator pump or valve 58. In addition to indicating when a bale is complete in the baling chamber a bale size sensor 36 and/or weight sensor can be employed by the ECU to correlate bale size/weight with moisture content and moisture content ratio. It is also conceivable to correlate moisture content information with GPS location information provided by a GPS Receiver 60 for mapping fields, making usable yield calculations etc. By employing a plurality of sensor elements 48 it is possible for the ECU 40 to not only determine the moisture content of the incoming crop material but also to determine based upon the various sensor output signals the percentage of crop material that is at or above a particular moisture content value. For example, this can be done by calculating the average sensed moisture content of incoming crop material across all sensor elements at any given point in time. Further by knowing the average moisture content readings across all sensor elements at any given point in time the ECU can be programmed to determine a total average moisture content of the bale at any point during the baling process as well as the percentage of the bale that is at or above a particular moisture level. The ECU can also be programmed to determine whether the more moist crop material is more evenly distributed amongst dryer material or whether there is a concentration of moist material in some portion of the bale.

Figure 4:
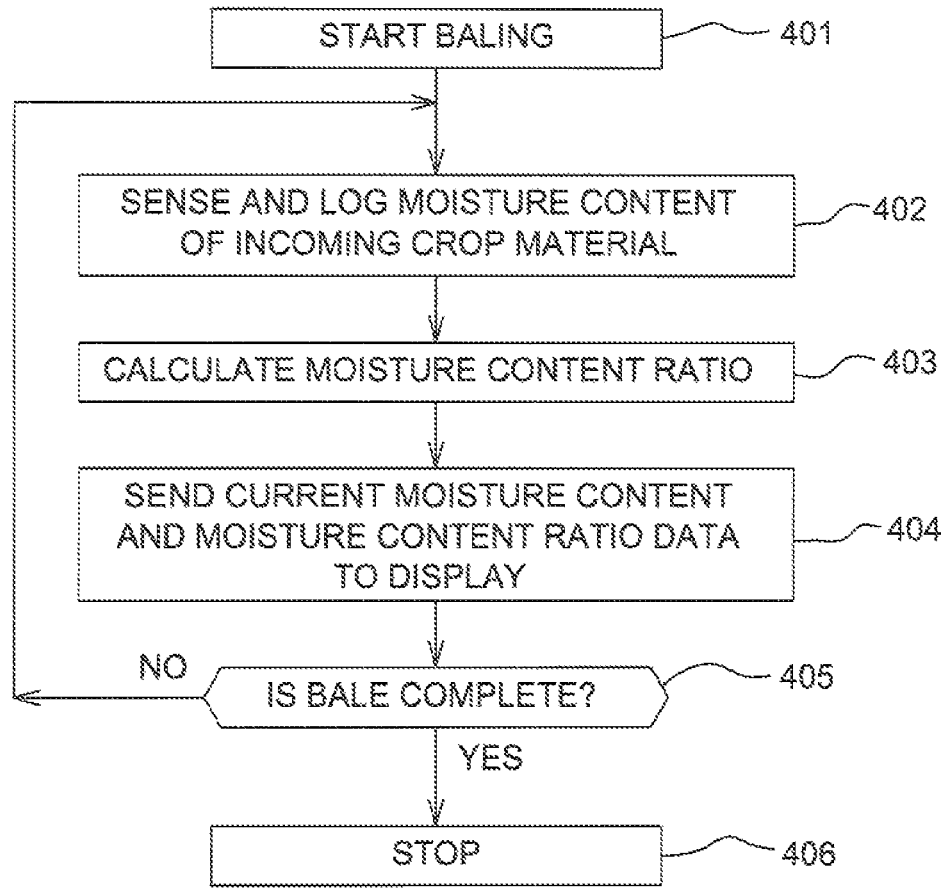
FIG. 4 is a flowchart illustrating the logic of a first embodiment employed by the moisture sensing arrangement of FIG. 3; and, FIG. 5 is a flowchart illustrating the logic of a second embodiment employed by the moisture sensing arrangement of FIG. 3.

The flowchart of FIG. 4 illustrates a first embodiment for the logic employed in the ECU. More particularly at 401 the baling operation is commenced and as crop material begins to enter the baler, the moisture sensor array senses the moisture content of the incoming crop material and sends that data to the ECU where it is stored at 402. At 403 the ECU uses the data from the sensors to calculate the moisture content ratio. The ECU at 404 sends the moisture content and moisture content ratio data to the operator output (display). The ECU next queries at 405 whether the size/weight sensor is indicating that the bale is complete. If the answer at 405 is yes, the logic stops at 406 until a new bale is started. If the answer at 405 is no, then the logic reverts to 402. In this embodiment no preset values are compared and thus no warnings are provided to the operator other than the moisture content and moisture content ratio. It is thus up to the operator to make a determination as to whether the moisture content and moisture content ratio are within an acceptable range.

FIG. 5 illustrates an alternative embodiment of the logic wherein after the start at 501 the operator inputs a high moisture content threshold value or set-point at 502. The high moisture content threshold value represents a moisture content of crop material entering the baler, below which it is safe to store the bale without fear of mold, decomposition or heat. Next the operator inputs a high moisture content ratio threshold value or set-point at 503. The high moisture content ratio represents a percentage of incoming crop material that is above the high moisture content set-point at which it is deemed necessary to alert the operator that the bale is not in condition for storage. At 504 the baling process is commenced and the moisture sensor array senses the moisture content of the incoming material and sends that data to the ECU where it is stored at 505. At 506 the ECU uses the data from the sensors to calculate the moisture content ratio. The ECU at 507 sends the moisture content and moisture content ratio data to the operator output (display). At 508 the ECU queries whether the high moisture content threshold input at 502 has been met/exceeded. If the answer at 508 is no, then the ECU continues monitoring moisture content and ratio until the bale is complete. If the answer at 508 is yes, then the ECU queries at 509 whether the moisture content ratio has met/exceeded the high moisture content ratio threshold value input at 503. If the answer at 509 is no, then the ECU continues monitoring moisture content and ratio until the bale is complete. If the answer at 509 is yes, then a warning is sent to the operator output device (display/alarm) at 510. At 511 the ECU queries whether the bale is complete. If the answer at 511 is yes, then the logic stops at 512 until a new bale is started. If the answer at 511 is no, then the logic reverts to 505. As can be seen this embodiment allows the operator to pre-program the ECU with threshold values for moisture content and moisture content ratio above which the operator will receive a visual or audible warning, thereby allowing the operator to take appropriate action.

Having described the preferred embodiments it should now be apparent, that alternatives are contemplated wherein the method and apparatus of the invention are utilized with either fixed or variable chamber round balers and large and small square balers, as well as a variety of available moisture sensors, and can be utilized with a variety of operator display and or warning devices.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method for determining a moisture content ratio of crop material during a baling process with an agricultural baler, the baler having a moisture sensor array disposed for sensing the moisture content of crop material entering the baler, and an ECU in communication with the moisture sensor array, the method comprising the steps of:

sensing a moisture content of crop material entering the baler;

communicating the moisture content of the incoming crop material to the ECU;

calculating in the ECU a moisture content ratio, the moisture content ratio representing a percentage of crop material entering the baler that is at or above a particular moisture content; and, communicating the moisture content ratio information to an operator.

2. A method for determining a moisture content ratio of crop material during a baling process with an agricultural baler, the baler having a moisture sensor array disposed for sensing the moisture content of crop material entering the baler, and an ECU in communication with the moisture sensor array, the method comprising the steps of:

inputting a high moisture set point in the ECU, the high moisture set point corresponding to a moisture content of crop material entering the baler, below which it is deemed safe to store the bale;

inputting a high moisture set point ratio in the ECU, the high moisture set point ratio corresponding to a percentage of incoming crop material that is above the high moisture set-point at which it is deemed necessary to alert an operator that the bale is not in condition for storage;

commencing a baling process;

sensing a moisture content of the incoming crop material;
determining whether the sensed moisture content of incoming crop material one of meets and exceeds the high moisture set point;
calculating a moisture content ratio, the moisture content ratio representing a percentage of crop material entering the baler that is at or above a particular moisture content;
determining whether the calculated moisture content ratio of incoming crop material one of meets and exceeds the high moisture set point ratio; and,
if the calculated moisture content ratio of incoming crop material one of meets and exceeds the high moisture set point ratio communicating a notification to the operator.

* * * * *